United States Patent
Tajiri

(10) Patent No.: US 10,778,740 B2
(45) Date of Patent: Sep. 15, 2020

(54) VIDEO IMAGE DISTRIBUTION APPARATUS, CONTROL METHOD, AND RECORDING MEDIUM

(71) Applicant: CANON KABUSHIKI KAISHA, Tokyo (JP)

(72) Inventor: Katsutoshi Tajiri, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/207,634

(22) Filed: Dec. 3, 2018

(65) Prior Publication Data

US 2019/0182303 A1    Jun. 13, 2019

(30) Foreign Application Priority Data

Dec. 7, 2017   (JP) ................................ 2017-235238

(51) Int. Cl.

| | | |
|---|---|---|
| G06F 15/16 | (2006.01) | |
| H04L 29/06 | (2006.01) | |
| H04N 21/2343 | (2011.01) | |
| H04N 21/242 | (2011.01) | |
| H04N 21/845 | (2011.01) | |
| H04N 21/43 | (2011.01) | |
| H04N 21/61 | (2011.01) | |
| H04N 21/262 | (2011.01) | |

(Continued)

(52) U.S. Cl.
CPC ........ *H04L 65/601* (2013.01); *H04L 65/4084* (2013.01); *H04L 65/4092* (2013.01); *H04N 21/23439* (2013.01); *H04N 21/242* (2013.01); *H04N 21/26258* (2013.01); *H04N 21/4305* (2013.01); *H04N 21/6125* (2013.01); *H04N 21/8456* (2013.01); *H04W 56/00* (2013.01); *H04L 67/02* (2013.01)

(58) Field of Classification Search
CPC ............... H04L 65/601; H04L 65/4084; H04L 65/4092; H04L 67/02; H04N 21/23439; H04N 21/242; H04N 21/26258; H04N 21/4305; H04N 21/6125; H04N 21/8456; H04W 56/00
USPC ........................................................ 709/219
See application file for complete search history.

(56) References Cited

U.S. PATENT DOCUMENTS

2010/0195974 A1*   8/2010   Zheng .............. H04N 21/23106
                                                386/343

FOREIGN PATENT DOCUMENTS

| EP | 2528397 A1 | 11/2012 |
|---|---|---|
| JP | 2016-509400 A | 3/2016 |

(Continued)

*Primary Examiner* — Wing F Chan
*Assistant Examiner* — Joseph R Maniwang
(74) *Attorney, Agent, or Firm* — Canon U.S.A., Inc. IP Division

(57) ABSTRACT

A video image distribution apparatus includes a reception unit configured to receive a video data distribution start request from a client apparatus, an extraction unit configured to extract, from the video data distribution start request, information indicating a client time measured by the client apparatus as a transmission timing at which the client apparatus transmits the video data distribution start request, in a case where the extraction unit receives the video data distribution start request, a first determination unit configured to determine a video data distributable time based at least on the client time, and a transmission unit configured to transmit the video data distributable time to the client apparatus.

11 Claims, 8 Drawing Sheets

(51) Int. Cl.
*H04W 56/00* (2009.01)
*H04L 29/08* (2006.01)

(56) References Cited

FOREIGN PATENT DOCUMENTS

| WO | 2014/108207 A1 | 7/2014 |
| WO | 2016/099354 A1 | 6/2016 |

* cited by examiner

VIDEO IMAGE DISTRIBUTION APPARATUS, CONTROL METHOD, AND RECORDING MEDIUM

BACKGROUND OF THE INVENTION

Field of the Invention

The present invention relates to a video image distribution apparatus, a control method, and a recording medium.

Description of the Related Art

The number of distribution systems using an Internet Protocol (IP) network such as the Internet has been increasing. Such distribution systems are used in, for example, Internet sites for distributing the conditions of ski areas, zoos, etc., and for monitoring shops, buildings, etc. In the field of moving image services, streaming techniques such as Dynamic Adaptive Streaming over Hypertext Transfer Protocol (HTTP) (DASH) and HTTP Live Streaming (HLS) implemented mainly by Apple Inc. are increasingly used. They are techniques that are standardized by the Moving Picture Experts Group (MPEG). In the video image distribution techniques, issues of the Real-time Transport Protocol (RTP) are solved, such as a network environment issue and an issue that a special client application is required. Specifically, the video image distribution techniques enable reception and reproduction of moving image distribution on a normal browser.

In general DASH distribution, a distribution server divides a plurality of moving image data of different resolutions and bit rates into moving image files referred to as segments of a unit of several seconds. Then, a client sequentially downloads and reproduces the moving image files that are most suitable for its display capacity and communication bands. Specifically, the client first acquires a media presentation description (MPD) file in which entire moving image information is described, and then selects a moving image stream of a suitable resolution or bit rate from the MPD file. Then, the client downloads and reproduces moving image data of a MPEG-2 transport stream (TS) or MPEG-4 (MP4) file, segment by segment, based on the description of MPD.

In the MPD file, a distributable time (availability start time, etc.) is described. Thus, especially in live distribution, the client can defer acquisition of moving image data until the distributable time, or the client can acquire moving image data from current moving image data if the distributable time has been passed. Thus, it is important to synchronize the time in advance between the distribution server and the client. Meanwhile, Japanese Unexamined Patent Application Publication (Translation of PCT Application) NO. 2016-509400 discusses a technique that the time at which content data is retrievable and a time synchronization method are included in a MPD file and a client synchronizes the time using the time synchronization method described in the MPD file.

The conventional technique, however, requires the time of a client apparatus to be changed in order to view moving image data. An improved solution is therefore desired.

SUMMARY OF THE INVENTION

The present invention is directed to a mechanism by which a client apparatus that does not perform time synchronization with a distribution server is enabled to request acquisition of video data at a suitable timing without the necessity to change the time. To provide such a mechanism, for example, the following configuration is included.

According to an aspect of the present invention, a video image distribution apparatus includes a reception unit configured to receive a video data distribution start request from a client apparatus, an extraction unit configured to extract, from the video data distribution start request, information indicating a client time measured by the client apparatus as a transmission timing at which the client apparatus transmits the video data distribution start request, in a case where the extraction unit receives the video data distribution start request, a first determination unit configured to determine a video data distributable time based at least on the client time, and a transmission unit configured to transmit the video data distributable time to the client apparatus.

Further features of the present invention will become apparent from the following description of exemplary embodiments with reference to the attached drawings.

DESCRIPTION OF THE EMBODIMENTS

Various exemplary embodiments of the present invention will be described below with reference to the drawings.

Figure 1:
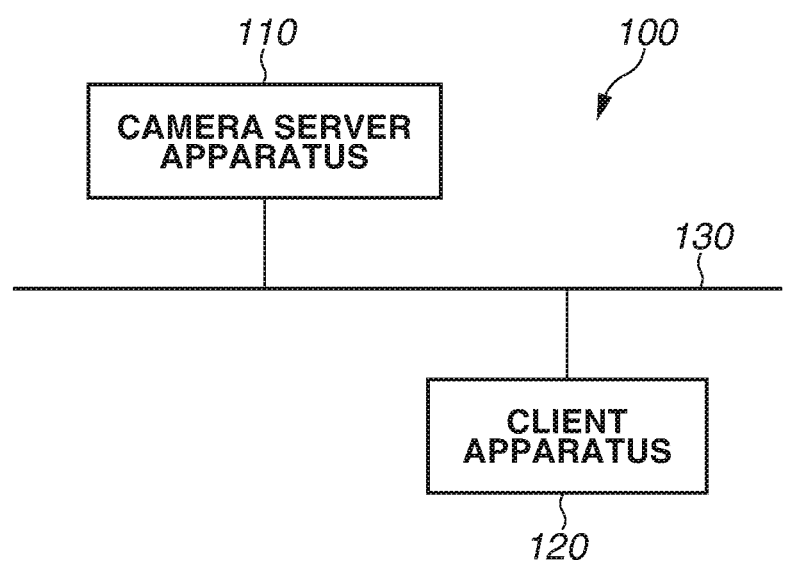
FIG. 1 is an entire view illustrating a video image distribution system.

FIG. 1 is an entire view illustrating a video image distribution system 100 according to a first exemplary embodiment. The video image distribution system 100 includes a camera server apparatus 110 and a client apparatus 120. The camera server apparatus 110 and the client apparatus 120 are connected with each other via a network 130. The camera server apparatus 110 includes a camera and distributes captured video data to the client apparatus 120 via the network 130. The client apparatus 120 accesses the camera server apparatus 110 to acquire the video data. The camera server apparatus 110 may also be referred to as a video image distribution apparatus, as it is configured to control the distribution of video images in a video image distribution system as will be described below.

While FIG. 1 illustrates only one camera server apparatus 110 to simplify the description, the video image distribution system 100 can include two or more camera server apparatuses 110. Further, there can be a client apparatus, which accesses the camera server apparatus 110 to receive an image, other than the client apparatus 120. The network 130 includes a plurality of routers, switches, and cables that satisfies communication standards such as Ethernet®. The communication standards, scale, and configuration of the network 130 are not particularly limited. The network 130 can be, for example, from the Internet to a local area network (LAN).

While video data is described as distribution target data of the camera server apparatus 110 in the present exemplary embodiment, the distribution target data can include data other than video data. Examples of data other than video data include audio data, image/audio analysis data, and caption data.

Figure 2:
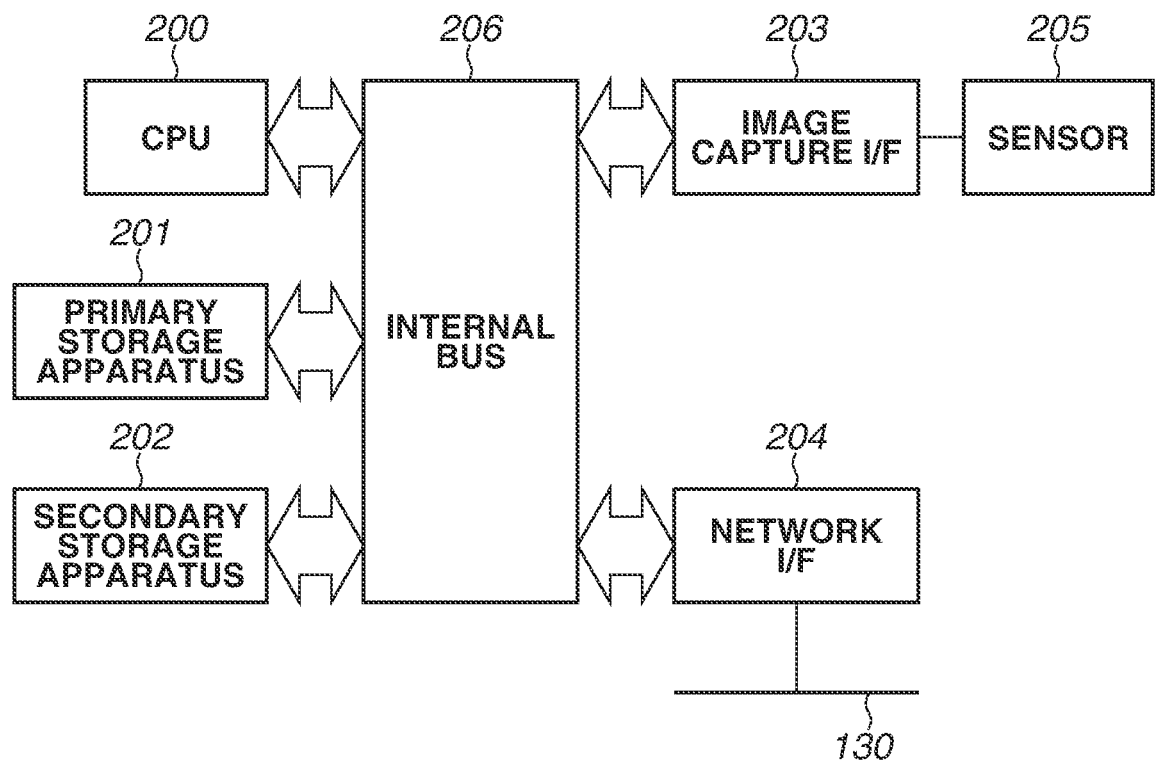
FIG. 2 illustrates a hardware configuration of a camera server apparatus.

FIG. 2 illustrates a hardware configuration of the camera server apparatus 110. A central processing unit (CPU) 200, a primary storage apparatus 201, a secondary storage apparatus 202, an image capture interface (I/F) 203, and a network I/F 204 are connected with one another via an internal bus 206. The CPU 200 controls the entire camera server apparatus 110. The primary storage apparatus 201 is a high-speed writable storage apparatus such as a random-access memory (RAM), and an operating system (OS), various programs, and various types of data are loaded into the primary storage apparatus 201. Further, the primary storage apparatus 201 is also used as a work area of the OS and the various programs. The secondary storage apparatus 202 is a non-volatile storage apparatus such as a flash memory, hard disk drive (HDD), or secure digital (SD) card and is used as a permanent storage area for the OS, the various programs, and various types of data as well as a temporary storage area for various types of data. The CPU 200 reads and executes a program stored in the secondary storage apparatus 202 to realize the functions and processing of the camera server apparatus 110 described below.

The image capture OF 203 is connected with a sensor (image sensor) 205 consists of a charge-coupled device (CCD) sensor or a complementary metal oxide semiconductor (CMOS) sensor. The image capture OF 203 converts image data acquired from the sensor 205 into a predetermined format, compresses the converted image data, and transfers the compressed image data to the primary storage apparatus 201. The network OF 204 is an interface for connecting to the network 130 and performs communication with the client apparatus 120, etc.

Figure 3:
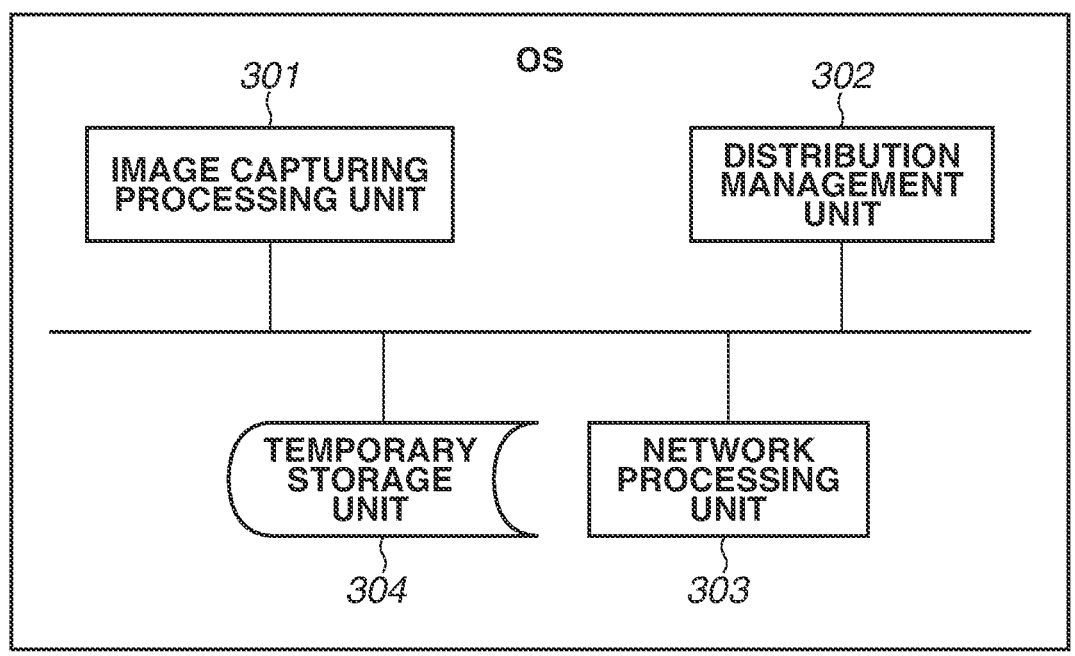
FIG. 3 illustrates a functional configuration of the camera server apparatus.

FIG. 3 illustrates a functional configuration of the camera server apparatus 110. An image capturing processing unit 301 acquires a video frame generated by the sensor 205 via the image capture OF 203, performs encoding processing on the acquired video frame, and stores the encoded video frame in the primary storage apparatus 201. The primary storage apparatus 201 temporarily stores the generated video frame. The video frame stored in the primary storage apparatus 201 is erased after the distribution of the video frame is completed.

When a distribution management unit 302 receives a distribution start request from the client apparatus 120, the distribution management unit 302 transmits a media presentation description (MPD) file including a distributable time and distributable video image stream information to the client apparatus 120 via a network processing unit 303. The distribution start request is a MPD file acquisition request. The distribution management unit 302 further converts a single or a plurality of video frames accumulated in the primary storage apparatus 201 into a transmittable segment file (moving image file). Then, the distribution management unit 302 transmits the segment file to the client apparatus 120 via the network processing unit 303 according to the request from the client apparatus 120.

Alternatively, in the cases in which a protocol such as Hypertext Transfer Protocol (HTTP)/2 or WebSocket is employed, the distribution management unit 302 can transmit segment files one after another each time a video frame is generated, and a segment file is completely generated without receiving a request. While the distribution management unit 302 converts the video frames into the segment files in the above description, a common segment file for all clients can be generated at the time of video image generation.

Figure 4:
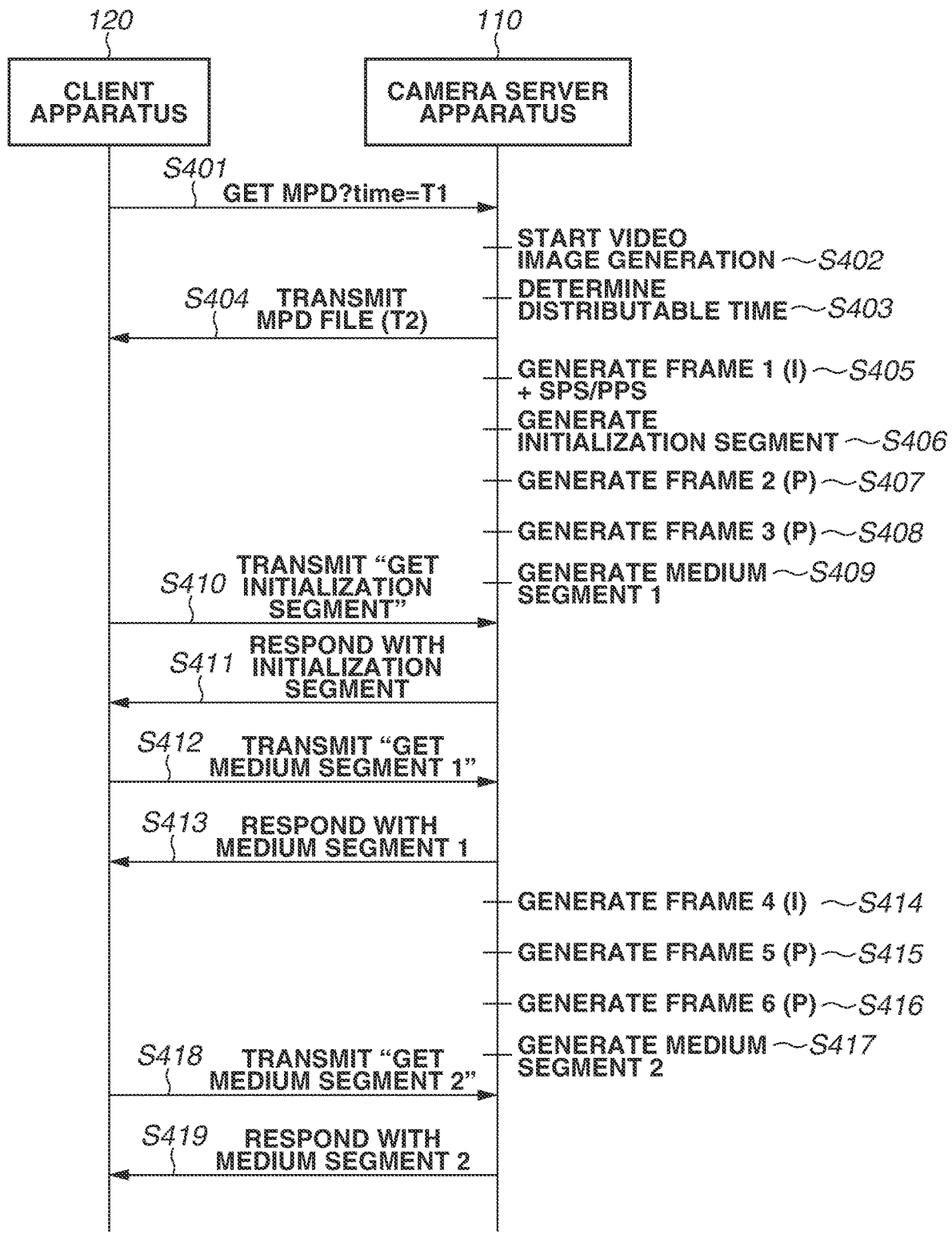
FIG. 4 is a sequence diagram illustrating a process of video image distribution.

FIG. 4 is a sequence diagram illustrating a process of video image distribution from the camera server apparatus 110 to the client apparatus 120. In step S401, the client apparatus 120 transmits, to the camera server apparatus 110, a distribution start request including a time (T1) measured by the client apparatus 120 at the time point of the processing in step S401 (transmission time point). Hereinafter, the time (T1) measured by the client apparatus 120 will be referred to as a "client time". If the camera server apparatus 110 receives the distribution start request, then in step S402, the camera server apparatus 110 starts video image generation to generate a distributable video image stream. In step S403, the camera server apparatus 110 determines, as a distributable time (T2), a value obtained by adding a reference time (D1) for distributable video data to be prepared to the client time (T1) included in the distribution start request. Details of the reference time (D1) will be described below.

In step S404, the camera server apparatus 110 generates a MPD file to which the distributable time (T2) is set as an availability start time, and transmits the generated MPD file to the client apparatus 120. In step S405, the camera server apparatus 110 generates a video frame 1 (I-frame) including a sequence parameter set and a picture parameter set (SPS/PPS), etc. In step S406, the camera server apparatus 110 generates an initialization segment that is a first video data from the SPS/PPS, etc. In step S407, the camera server apparatus 110 generates a video frame 2 (P-frame) that is a difference video image from the video frame 1. In step S408, the camera server apparatus 110 generates a video frame 3 (P-frame) that is a difference video image from the video frame 2. In step S409, the camera server apparatus 110 generates a medium segment 1 from the video frames 1, 2, and 3. While the difference video images are P-frames in the present exemplary embodiment, the difference video images can be B-frames.

Subsequently, when the current time of the processing time point becomes the time set as the availability start time of the MPD file, then in step S410, the client apparatus 120 transmits an initialization segment acquisition request to the camera server apparatus 110. In step S411, the client apparatus 120 receives the initialization segment as a response from the camera server apparatus 110. In step S412, the client apparatus 120 transmits a request for acquisition of the medium segment 1 to the camera server apparatus 110. In step S413, the client apparatus 120 receives the medium segment 1 as a response from the camera server apparatus 110. While the client apparatus 120 acquires the initialization segment at or after the distributable time in the present exemplary embodiment, the client apparatus 120 can acquire the initialization segment before the distributable time, since the initialization segment can be generated in advance.

Similarly, in step S414, the camera server apparatus 110 generates a video frame 4 (I-frame). In step S415, the camera server apparatus 110 generates a video frame 5 (P-frame). In step S416, the camera server apparatus 110 generates a video frame 6 (P-frame). In step S417, the camera server apparatus 110 generates a medium segment 2 from the video frames 4, 5, and 6. Then, in step S418, the client apparatus 120 transmits a request for acquisition of the medium segment 2 to the camera server apparatus 110 at or after the time at which the medium segment 2 is generated. In step S419, the client apparatus 120 receives the medium segment 2 as a response from the camera server apparatus 110.

Figure 5:
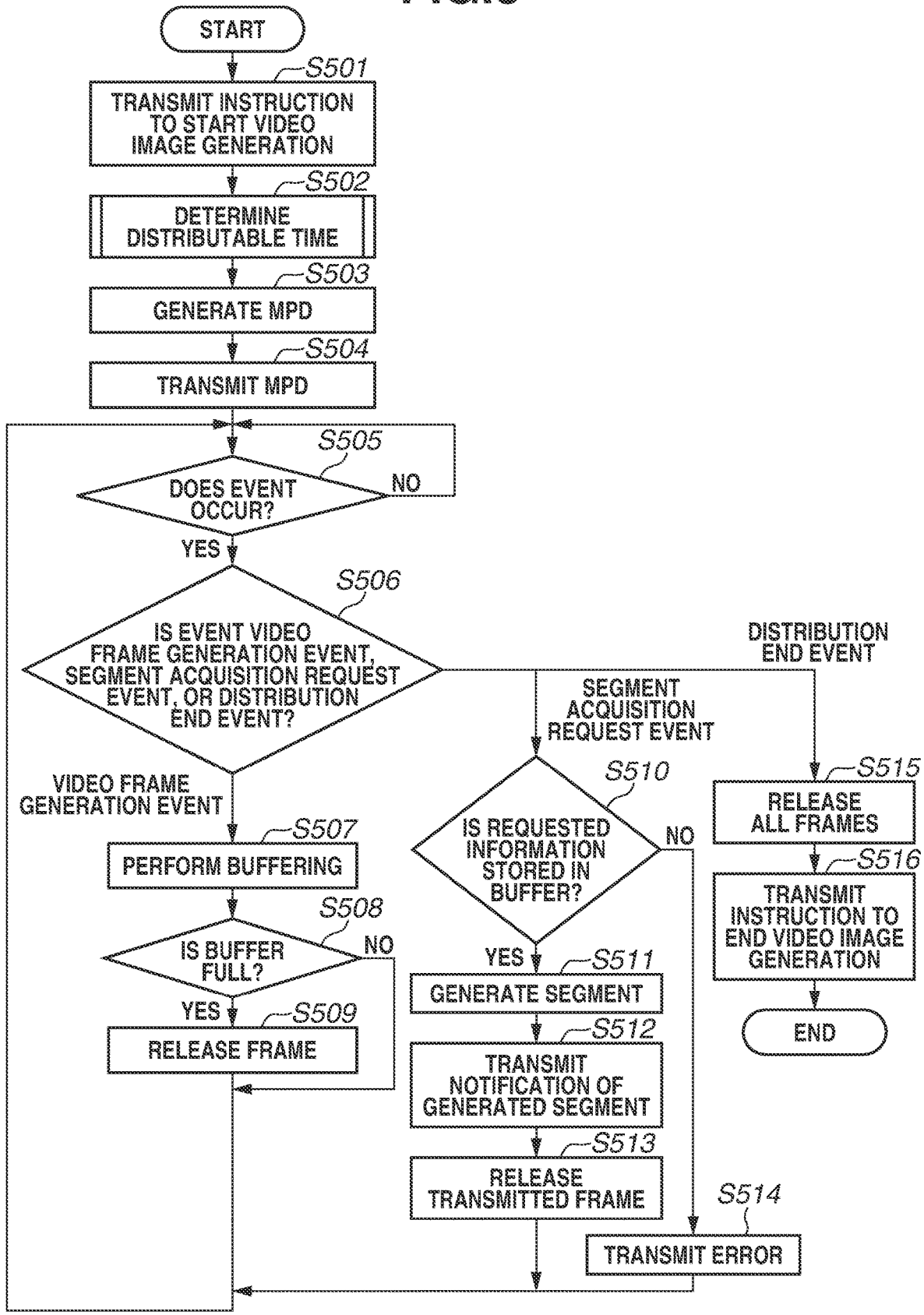
FIG. 5 is a flowchart illustrating a process of video image distribution.

FIG. 5 is a flowchart illustrating a process of video image distribution by the camera server apparatus 110. The process of video image distribution is executed at the time of reception of the distribution start request from the client apparatus 120. In step S501, the distribution management unit 302 transmits, to the image capturing processing unit 301, an instruction to start video image generation to generate a distributable video image stream. In step S502, the distribution management unit 302 determines the distributable time based on the client time (T1) included in the distribution start request. The processing in step S502 will be described below with reference to FIG. 6.

In step S503, the distribution management unit 302 sets the distributable time determined in step S502 as the availability start time of the MPD file, and generates the MPD file. In step S504, the distribution management unit 302 transmits the MPD file to the client apparatus 120 via the network processing unit 303. In step S505, the distribution management unit 302 waits until an event occurs, and in a case where an event occurs (YES in step S505), the processing proceeds to step S506.

In step S506, the distribution management unit 302 determines a type of the event. In a case where the distribution management unit 302 determines that a type of the event is a video frame generation event ("video frame generation event" in step S506), the processing proceeds to step S507. In a case where the distribution management unit 302 determines that a type of the event is a segment acquisition request event ("segment acquisition request event" in step S506), the processing proceeds to step S510. The segment acquisition request is information that requests acquisition of the initialization segment or medium segment. In a case where the distribution management unit 302 determines that a type of the event is a distribution end event ("distribution end event" in step S506), the processing proceeds to step S515.

In step S507, the distribution management unit 302 buffers the video frame in the primary storage apparatus 201. At this time, the distribution management unit 302 stores not only the video frame but also information such as SPS/PPS in a buffer. In step S508, the distribution management unit 302 determines whether the buffer is full. In a case where the distribution management unit 302 determines that the buffer is not full (NO in step S508), the processing proceeds to step S505. On the other hand, in a case where the distribution management unit 302 determines that the buffer is full (YES in step S508), the processing proceeds to step S509. In step S509, the distribution management unit 302 releases an old video frame, and then the processing proceeds to step S505.

In step S510, the distribution management unit 302 determines whether the requested information included in the requested segment is stored in the buffer. In a case where the distribution management unit 302 determines that the requested information is stored in the buffer (YES in step S510), the processing proceeds to step S511. On the other hand, in a case where the distribution management unit 302 determines that the requested information is not stored in the buffer (NO in step S510), the processing proceeds to step S514. In step S511, the distribution management unit 302 generates the requested segment (initialization segment or medium segment). The distribution management unit 302 can set the time of the initialization segment or one of the medium segments from the distributable time as a start point, as the time to be included in the initialization segment or medium segment to be generated. In step S512, the distribution management unit 302 transmits the segment generated in step S511 to the client apparatus 120. In step S513, the distribution management unit 302 releases the transmitted video frame from the buffer, and then the processing proceeds to step S505.

In step S514, the distribution management unit 302 transmits an error response to the client apparatus 120, and then the processing proceeds to step S505. In step S515, the distribution management unit 302 releases all the information stored in the buffer. In step S516, the distribution management unit 302 transmits an instruction to stop the video image generation to the image capturing processing unit 301. Then, the process of video image distribution ends.

Figure 6:
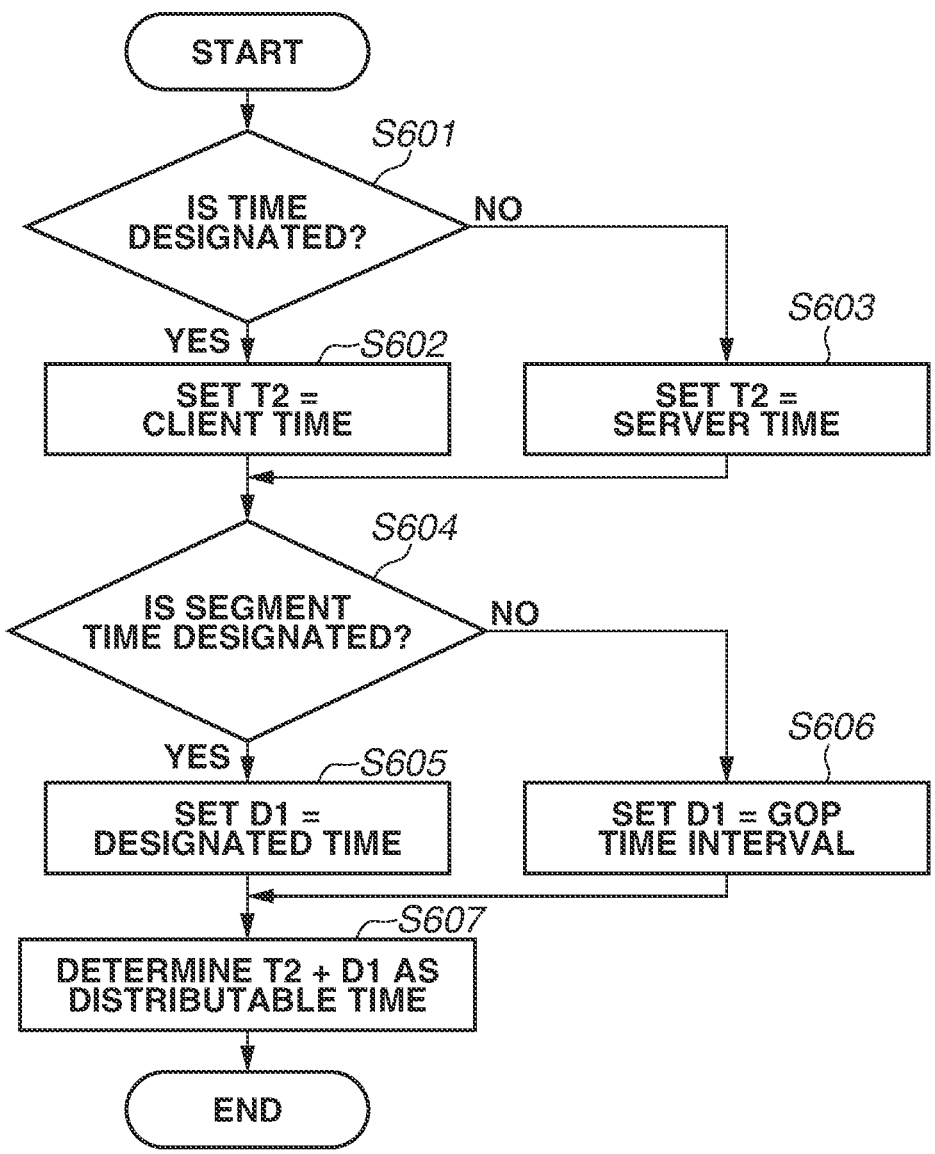
FIG. 6 is a flowchart illustrating a process of distributable time determination.

FIG. 6 is a flowchart illustrating details of distributable time determination processing (step S502) described above with reference to FIG. 5. As a premise, there is a case in which the client time is included in the MPD file received by the camera server apparatus 110 from the client apparatus 120 and a case in which the client time is not included in the received MPD file. Similarly, there is a case in which a segment time is included in the MPD file received by the camera server apparatus 110 from the client apparatus 120 and a case in which the segment time is not included in the received MPD file. As used herein, the segment time is a time that is set by a user of the client apparatus 120 as the time needed for the camera server apparatus 110 to prepare a distributable segment.

In step S601, the distribution management unit 302 determines whether the client time (T1) is designated in the MPD file. In a case where the distribution management unit 302 determines that the client time (T1) is designated (YES in step S601), the processing proceeds to step S602. In a case where the distribution management unit 302 determines that the client time (T1) is not designated (NO in step S601), the processing proceeds to step S603. In step S602, the distribution management unit 302 extracts the client time (T1) from the MPD file and sets the client time (T1) as the start time (T2), and then the processing proceeds to step S604. On the other hand, in step S603, the distribution management unit 302 sets, as the start time (T2), the current time (server time) measured by the camera server apparatus 110 at the time point of the processing in step S603, and then the processing proceeds to step S604. As used herein, the client time (T1) is a time that is measured by the client apparatus 120 as a transmission timing at which the client apparatus 120 transmits the distribution start request. Further, the server time is a time that is measured by the camera server apparatus 110 as a reception timing at which the camera server apparatus 110 receives the distribution start request.

In step S604, the distribution management unit 302 determines whether the segment time is designated in the MPD file. In a case where the distribution management unit 302 determines that the segment time is designated (YES in step S604), the processing proceeds to step S605. In a case where the distribution management unit 302 determines that the segment time is not designated (NO in step S604), the processing proceeds to step S606. In step S605, the distribution management unit 302 sets the segment time as the reference time (D1), and then the processing proceeds to step S607. On the other hand, in step S606, the distribution management unit 302 sets, as the reference time (D1), a group-of-pictures (GOP) time interval, which is a time interval from an I-frame to an I-frame. For example, the GOP time interval is a period that corresponds to a time period for generating three video frames. The GOP time interval is set as a default value of the reference time (D1) in the camera server apparatus 110. The default value can be a value that is preset in the camera server apparatus 110 and is not limited to the GOP time interval. Further, the time set as the default value can be different for each video image stream. In step S607, the distribution management unit 302 determines, as the distributable time, a value obtained by adding the reference time (D1) to the start time (T2). Then, the distributable time determination processing (step S502 in FIG. 5) ends.

As described above, in the video image distribution system 100 in the first exemplary embodiment, the camera server apparatus 110 receives the current time from the client apparatus 120 to determine the distribution start time at the client apparatus 120 and transmits the determined distribution start time to the client apparatus 120. This enables the client apparatus 120 to transmit a segment acquisition request to the camera server apparatus 110 at a suitable timing without the necessity to change the time. In this way, a mechanism is provided by which a client apparatus that does not perform time synchronization with a distribution server is enabled to request acquisition of video data at a suitable timing without the necessity to change the time.

In a first modified example of the first exemplary embodiment, in step S607, the distribution management unit 302 is only required to determine the distributable time based on the start time (T2) and the reference time (D1), and a specific process for the determination is not limited to the process described in the present exemplary embodiment. In another example, the distribution management unit 302 can add a value obtained by multiplying the reference time (D1) by 1.5 or 0.5 to the start time (T2).

In a second modified example, the reference time can be set to zero seconds if the segment time is short enough to be ignored, e.g., if the segment time is less than one second. Specifically, the client time can directly be determined as the video data distributable time.

In a third modified example, in step S607, the distribution management unit 302 can further determine the distributable time by adding time other than the reference time (D1) needed to enable distribution to the client apparatus 120. For example, the distribution management unit 302 can add a round trip time (RTT) needed for the communication between the camera server apparatus 110 and the client apparatus 120.

In a fourth modified example, the distributable time can be used as time information other than the availability start time. For example, the distributable time can be used as a publish time for use in an in-band event stream, etc.

Figure 7:
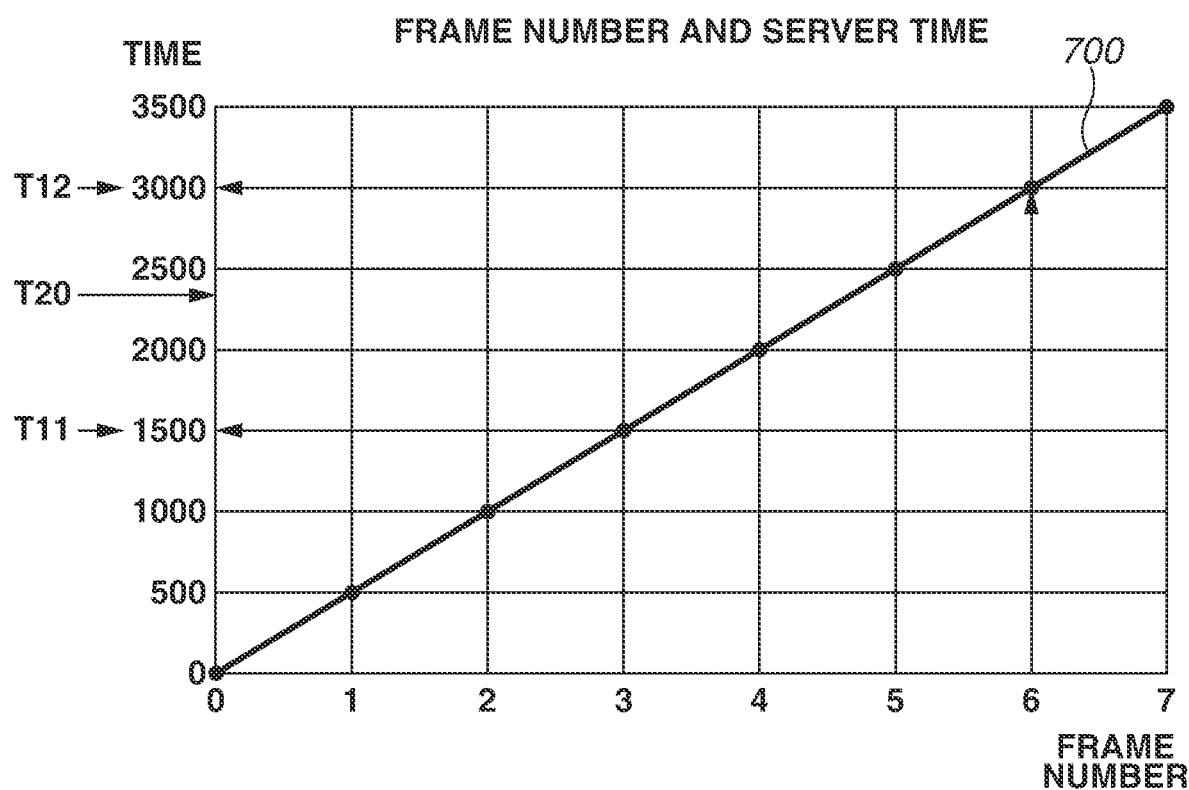
FIG. 7 is a relationship diagram illustrating timings of video image generation and distribution request.

Now, the following describes the video image distribution system 100 according to a second exemplary embodiment, focusing on differences compared to the video image distribution system 100 according to the first exemplary embodiment described above. FIG. 7 is a relationship diagram illustrating the timings of video image generation and distribution request in the second exemplary embodiment. In FIG. 7, the horizontal axis of the graph represents the number of a generated video frame, and the vertical axis of the graph represents time. Further, a straight line 700 indicates the time with respect to the number of a generated frame. As illustrated in FIG. 7, a segment 1 is generated at the timing (T11) at which a frame of the frame number 3 is generated. Further, a segment 2 is generated at the timing (T12) at which a frame of the frame number 6 is generated. Furthermore, the camera server apparatus 110 receives a distribution start request from the client apparatus 120 at a timing (T20) between the timings T11 and T12.

In this case, the camera server apparatus 110 is to start further distribution starting with the segment 1 that has been previously generated. The camera server apparatus 110 calculates the difference time (D2) between the timing (T20) and the time (T11) at which the segment 1 is generated. The difference time (D2) is obtained from "T20−T11". In this case, the start time (T2) is obtained from "T1−D2". Further, there can be a case in which the camera server apparatus 110 is to start distribution starting with the segment 2 that is to be generated next by the camera server apparatus 110. In this case, the camera server apparatus 110 calculates the difference time (D3) between the time (T12) at which the segment 2 is generated and the timing (T20). The difference time (D3) is obtained from "T12−T20". In this case, the start time (T2) is obtained from "T1+D3".

Figure 8:
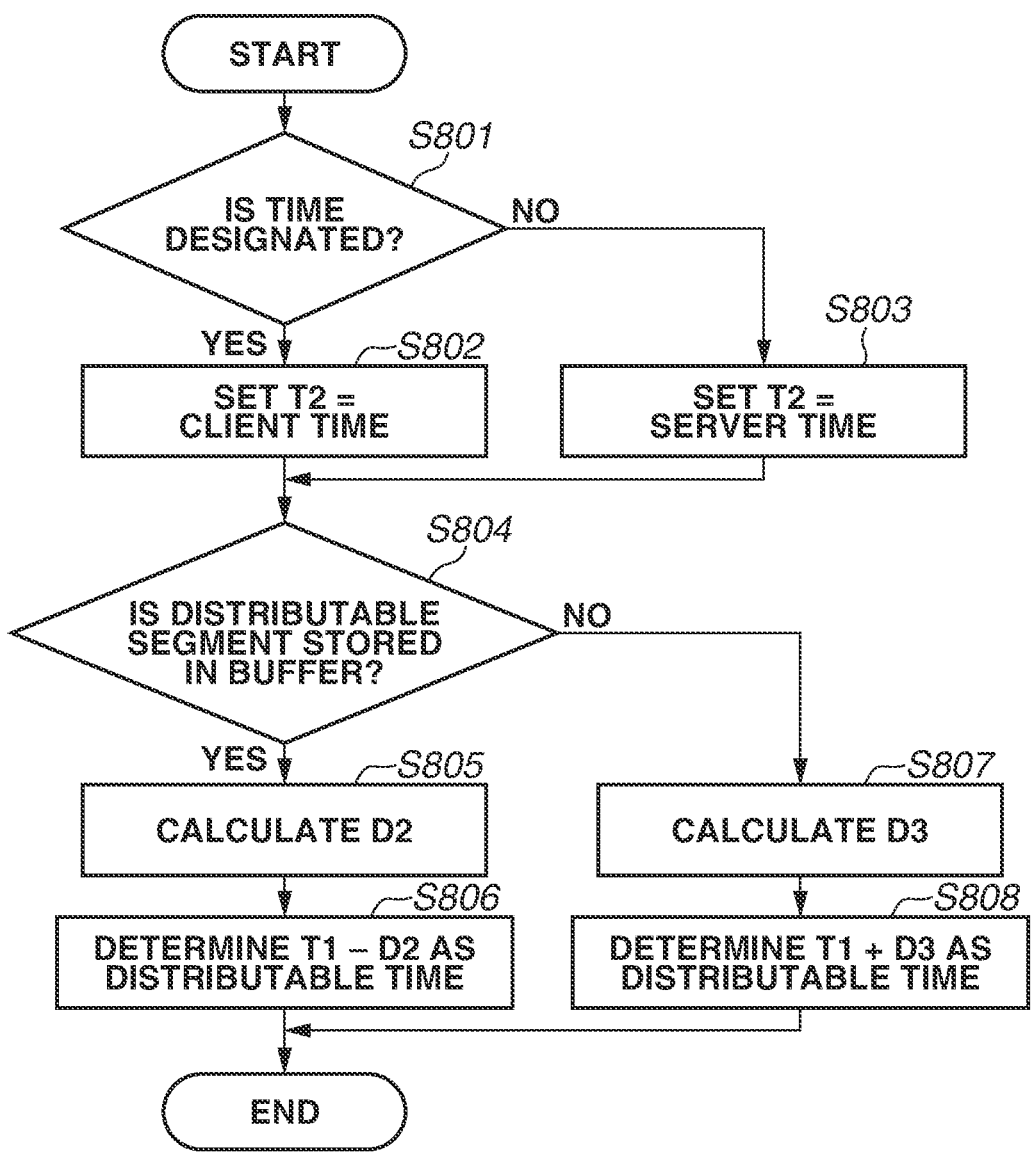
FIG. 8 is a flowchart illustrating a process of distributable time determination.

FIG. 8 is a flowchart illustrating a process of distributable time determination in the second exemplary embodiment. Steps S801 to S803 are similar to steps S601 to S603 described above with reference to FIG. 6. Then, in step S804, the distribution management unit 302 determines whether a distributable segment is stored in the buffer as a temporary storage unit 304. In a case where the distribution management unit 302 determines that a distributable segment is stored (YES in step S804), the processing proceeds to step S805. In a case where the distribution management unit 302 determines that no distributable segment is stored (NO in step S804), the processing proceeds to step S807.

In step S805, the distribution management unit 302 calculates the difference time (D2). In step S806, the distribution management unit 302 determines, as the distributable time, a value obtained by subtracting the difference time (D2) from the start time (T1). Then, the process of distributable time determination ends. On the other hand, in step S807, the distribution management unit 302 calculates the difference time (D3). In step S808, the distribution management unit 302 determines, as the distributable time, a value obtained by adding the difference time (D3) to the start time (T1). Then, the process of distributable time determination ends.

As described above, if there is a distributable segment in the buffer, the camera server apparatus 110 in the second exemplary embodiment starts distribution starting with the segment stored in the buffer. On the other hand, if no distributable segment is in the buffer, the camera server apparatus 110 starts distribution starting with a segment to be generated. The configuration and processing of the video image distribution system 100 in the second exemplary embodiment other than those described above are similar to those of the video image distribution system 100 in the first exemplary embodiment.

In a modified example of the second exemplary embodiment, the distribution management unit 302 can start distribution starting with a segment to be generated next even in the case in which a distributable segment is stored in the buffer. The distribution management unit 302 can start distribution starting with a segment to be generated next if, for example, an instruction is provided from the client apparatus 120.

While a Moving Picture Experts Group-Dynamic Adaptive Streaming over Hypertext Transfer Protocol (MPEG-DASH) distribution method is described as an example in the above-described exemplary embodiments, the present invention is also applicable to a distribution method using different HTTP adaptive streaming, such as HTTP Live Streaming (HLS), and a distribution method using any other time information.

While the exemplary embodiments of the present invention have been described in detail, the present invention is not to be limited by any specific exemplary embodiment of the present invention, and various modifications and changes are possible within the spirit of the claimed invention.

The above-described exemplary embodiments each provide a mechanism by which a client apparatus that does not perform time synchronization with a distribution server is enabled to request acquisition of video data at a suitable timing without the necessity to change the time.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-235238, filed Dec. 7, 2017, which is hereby incorporated by reference herein in its entirety.

What is claimed is:

1. A video image distribution apparatus comprising:
one or more hardware processors; and
one or more memories which store instructions executable by the one or more hardware processors to cause the video image distribution apparatus to perform as:
a reception unit configured to receive a video data distribution start request from a client apparatus;
an extraction unit configured to extract, from the video data distribution start request, information indicating a client time measured by the client apparatus as a transmission timing at which the client apparatus transmits the video data distribution start request, in a case where the extraction unit receives the video data distribution start request;
a first determination unit configured to determine a video data distributable time based at least on the client time; and
a transmission unit configured to transmit the video data distributable time to the client apparatus.

2. The video image distribution apparatus according to claim 1, wherein the first determination unit determines the video data distributable time based on the client time and a reference time for the video data distribution start request.

3. The video image distribution apparatus according to claim 2, wherein the first determination unit determines, as the video data distributable time, a time obtained by adding the reference time to the client time.

4. The video image distribution apparatus according to claim 3, wherein, in a case where distributable video data is not stored in a temporary storage unit, the first determination unit determines, as the video data distributable time, a time obtained by adding the reference time to the client time.

5. The video image distribution apparatus according to claim 2, wherein, in a case where distributable video data is stored in a temporary storage unit, the first determination unit determines, as the video data distributable time, a time obtained by subtracting the reference time from the client time.

6. The video image distribution apparatus according to claim 2, wherein the reference time is a time that is preset to the video image distribution apparatus.

7. The video image distribution apparatus according to claim 2,
wherein the reception unit further receives designation of the reference time from the client apparatus, and
wherein the first determination unit determines the video data distributable time based on the reference time received from the client apparatus.

8. The video image distribution apparatus according to claim 2, wherein, in a case where a designation of the reference time is received from the client apparatus, the first determination unit determines the video data distributable time based on the reference time designated by the client apparatus, and, in a case where the designation of the reference time is not received from the client apparatus, the first determination unit determines the video data distributable time based on a reference time that is preset to the video image distribution apparatus.

9. The video image distribution apparatus according to claim 2, wherein, in a case where the video data distribution start request does not include the client time, the first determination unit determines the video data distributable time based on the reference time and a time measured by the video image distribution apparatus as a reception timing at which the reception unit receives the video data distribution start request.

10. A control method that is executed by a video image distribution apparatus, the method comprising:
receiving a video data distribution start request from a client apparatus;
extracting, from the video data distribution start request, information indicating a client time measured by the client apparatus as a transmission timing at which the client apparatus transmits the video data distribution start request, in a case where the video data distribution start request is received;
determining a video data distributable time based at lease on the client time; and transmitting the video data distributable time to the client apparatus.

11. A non-transitory computer-readable recording medium that stores a program for causing a computer to implement a control method that is executed by a video image distribution apparatus, the control method comprising:
- receiving a video data distribution start request from a client apparatus;
- extracting, from the video data distribution start request, information indicating a client time measured by the client apparatus as a transmission timing at which the client apparatus transmits the video data distribution start request, in a case where the extraction unit receives the video data distribution start request;
- determining a video data distributable time based at least on the client time; and
- transmitting the video data distributable time to the client apparatus.

* * * * *